US011223110B2

(12) United States Patent
Sun et al.

(10) Patent No.: US 11,223,110 B2
(45) Date of Patent: Jan. 11, 2022

(54) UNMANNED AERIAL VEHICLE BUILT-IN ANTENNA AND UNMANNED AERIAL VEHICLE

(71) Applicant: AUTEL ROBOTICS CO., LTD., Guangdong (CN)

(72) Inventors: Yiye Sun, Guangdong (CN); Shengzhao Xiang, Guangdong (CN); Xuefeng Sun, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/993,610

(22) Filed: Aug. 14, 2020

(65) Prior Publication Data
US 2020/0373652 A1 Nov. 26, 2020

Related U.S. Application Data

(63) Continuation of application No. PCT/CN2018/110620, filed on Oct. 17, 2018.

(30) Foreign Application Priority Data

Feb. 14, 2018 (CN) .......................... 201810151715.5

(51) Int. Cl.
*H01Q 1/28* (2006.01)
*B64C 1/36* (2006.01)
(Continued)

(52) U.S. Cl.
CPC ............... *H01Q 1/287* (2013.01); *B64C 1/36* (2013.01); *B64C 39/024* (2013.01); *H01Q 1/48* (2013.01); *H01Q 9/065* (2013.01)

(58) Field of Classification Search
CPC ............ H01Q 1/28; H01Q 1/287; H01Q 1/48; H01Q 9/065; B64C 1/36; B64C 39/024
See application file for complete search history.

(56) References Cited

U.S. PATENT DOCUMENTS 10,734,716 B2 * 8/2020 Wangsvick .............. H01Q 1/52
2018/0233810 A1 * 8/2018 Sun ........................ H01Q 21/30
2018/0254565 A1 * 9/2018 Kol ........................ H01Q 1/286

FOREIGN PATENT DOCUMENTS

CN 206180088 U 5/2017
CN 206907919 U 1/2018
(Continued)

OTHER PUBLICATIONS

International Search Report dated Jan. 4, 2019; PCT/CN2018/110620.

*Primary Examiner* — Hoang V Nguyen

(57) ABSTRACT

The present invention provides an unmanned aerial vehicle built-in antenna. The unmanned aerial vehicle built-in antenna includes a substrate and a microstrip antenna disposed on the substrate. The substrate is provided with a first surface and a second surface disposed opposite to each other. The microstrip antenna includes a microstrip feeder, an antenna element arm, a grounding wire and a first grounding terminal that are disposed on the first surface of the substrate, a second grounding terminal disposed on the second surface of the substrate and a feeding coaxial line. A feed terminal of the feeding coaxial line is connected to a first terminal of the microstrip feeder, and a grounding terminal of the feeding coaxial line is connected to the first grounding terminal. A first end of the grounding wire is connected to a first terminal of the antenna element arm, and a second end of the grounding wire is connected to the first grounding terminal. The first grounding terminal is connected to the second grounding terminal.

18 Claims, 3 Drawing Sheets

(51) Int. Cl.
 *B64C 39/02* (2006.01)
 *H01Q 1/48* (2006.01)
 *H01Q 9/06* (2006.01)

(56) References Cited

FOREIGN PATENT DOCUMENTS

| CN | 207009650 U | 2/2018 |
| CN | 108598688 A | 9/2018 |
| CN | 207925670 U | 9/2018 |

\* cited by examiner

UNMANNED AERIAL VEHICLE BUILT-IN ANTENNA AND UNMANNED AERIAL VEHICLE

CROSS-REFERENCE

This application is a continuation application of International Application No. PCT/CN2018/110620, filed on Oct. 17, 2018, which claims priority of Chinese Patent Application No. 201810151715.5, filed on Feb. 14, 2018, which is incorporated herein by reference in its entirely.

BACKGROUND

Technical Field

Embodiments of the present invention relate to the field of antenna technologies, and in particular, to an unmanned aerial vehicle built-in antenna and an unmanned aerial vehicle.

Related Art

With the rapid development of wireless communications and requirements of various data services, antennas are mainly designed to be smaller with a plurality of frequency bands and broad frequency bands. Microstrip antennas are more widely used due to their compact structure, small volume, light weight, low costs, and easy integration with microstrip lines. A microstrip antenna is an antenna consisting of a conductor patch affixed to a dielectric substrate with a grounding plate, and uses a coaxial line to feed power, so that an electromagnetic field is excited between the conductor patch and the grounding plate, to radiate outward using a slit.

An existing unmanned aerial vehicle built-in antenna is usually disposed in a landing gear and is usually a microstrip antenna of 2.4 Hz or 5.8 Hz. Due to its relatively large size and a limitation by a size of a landing gear, a micro strip antenna working in a low frequency band (for example, a microstrip antenna of 900 MHz) cannot be disposed in the landing gear. Although a spatial size of an arm of the unmanned aerial vehicle is larger than that of the landing gear of the unmanned aerial vehicle, an environment of the arm of the unmanned aerial vehicle is more complex, easily affecting a communication signal of the antenna.

Therefore, a person skilled in the art urgently needs an unmanned aerial vehicle built-in antenna that can resolve problems of spatial size and environmental interference.

SUMMARY

Embodiments of the present invention provide an unmanned aerial vehicle built-in antenna and an unmanned aerial vehicle to resolve problems of spatial size and environmental interference.

To resolve the above technical problem, the following technical solutions are provided in the embodiments of the present invention:

According to a first aspect, an embodiment of the present invention provides an unmanned aerial vehicle built-in antenna, including:

a substrate and a microstrip antenna disposed on the substrate. The substrate is provided with a first surface and a second surface disposed opposite to each other.

The microstrip antenna includes a microstrip feeder, an antenna element arm, a grounding wire and a first grounding terminal that are disposed on the first surface of the substrate, a second grounding terminal disposed on the second surface of the substrate and a feeding coaxial line.

A feed terminal of the feeding coaxial line is connected to a first terminal of the microstrip feeder, and a grounding terminal of the feeding coaxial line is connected to the first grounding terminal.

A first end of the grounding wire is connected to a first terminal of the antenna element arm, and a second end of the grounding wire is connected to the first grounding terminal.

The first grounding terminal is connected to the second grounding terminal.

A second terminal of the microstrip feeder is connected to the antenna element arm.

In a possible implementation, the grounding wire and the microstrip feeder are parallel to each other.

The antenna element arm is perpendicular to the grounding wire and the microstrip feeder.

Alternatively, the grounding wire and the micro strip feeder form a U shape, and the antenna element arm is perpendicular to the microstrip feeder.

In a possible implementation, the antenna element arm is disposed on an edge of the substrate along a length direction of the substrate.

In a possible implementation, the first grounding terminal is disposed on the first surface of the substrate along the length direction of the substrate.

In a possible implementation, the second grounding terminal is disposed in the middle of the second surface of the substrate along the length direction of the substrate, and a projection area of the second grounding terminal on the substrate falls within a projection area of the first grounding terminal on the substrate.

In a possible implementation, the second grounding terminal is disposed on the substrate along the length direction of the substrate, and a projection area of the second grounding terminal on the substrate is greater than or equal to a projection area of motor wires and lamp panel wires in an arm of the unmanned aerial vehicle on the substrate.

In a possible implementation, the antenna further includes at least one through hole provided on the substrate.

The first grounding terminal is connected to the second grounding terminal through the at least one through hole.

In a possible implementation, the substrate is made of an FR-4 grade material.

In a possible implementation, the microstrip antenna is a microstrip antenna of 900 MHz.

According to a second aspect, an embodiment of the present invention provides an unmanned aerial vehicle, including an arm and the unmanned aerial vehicle built-in antenna according to the first aspect. The unmanned aerial vehicle built-in antenna is disposed in the arm.

According to the unmanned aerial vehicle built-in antenna and the unmanned aerial vehicle provided in the embodiments of the present invention, the antenna includes a substrate and a microstrip antenna disposed on the substrate. The substrate is provided with a first surface and a second surface disposed opposite to each other. The microstrip antenna includes a microstrip feeder, an antenna element arm, a grounding wire and a first grounding terminal that are disposed on the first surface of the substrate, a second grounding terminal disposed on the second surface of the substrate and a feeding coaxial line. A feed terminal of the feeding coaxial line is connected to a first terminal of the microstrip feeder, and a grounding terminal of the feeding coaxial line is connected to the first grounding terminal. A first end of the grounding wire is connected to a first terminal of the antenna element arm, and a second end of the grounding wire is connected to the first grounding terminal. The first grounding terminal is connected to the second grounding terminal. A second terminal of the microstrip feeder is connected to the antenna element arm. The microstrip antenna of the above unmanned aerial vehicle built-in antenna is disposed on the substrate, and can be built in the unmanned aerial vehicle and meet a built-in spatial size requirement. Moreover, due to existence of the second grounding terminal, internal cables such as motor wires, lamp panel wires and coaxial lines from other antennas inside the unmanned aerial vehicle have less impact on the built-in antenna, enabling the built-in antenna to work normally in a complex electromagnetic environment.

BRIEF DESCRIPTION OF THE DRAWINGS

To more clearly describe the technical solutions in the embodiments of the present invention or in the prior art, the following will briefly introduce the drawings required for describing the embodiments or the prior art. It is apparent that the drawings in the following description are only some embodiments described in the present invention, and a person of ordinary skill in the art may obtain drawings of other embodiments on the basis of these drawings without any creative effort.

DESCRIPTION OF REFERENCE NUMERALS

Figure 1:
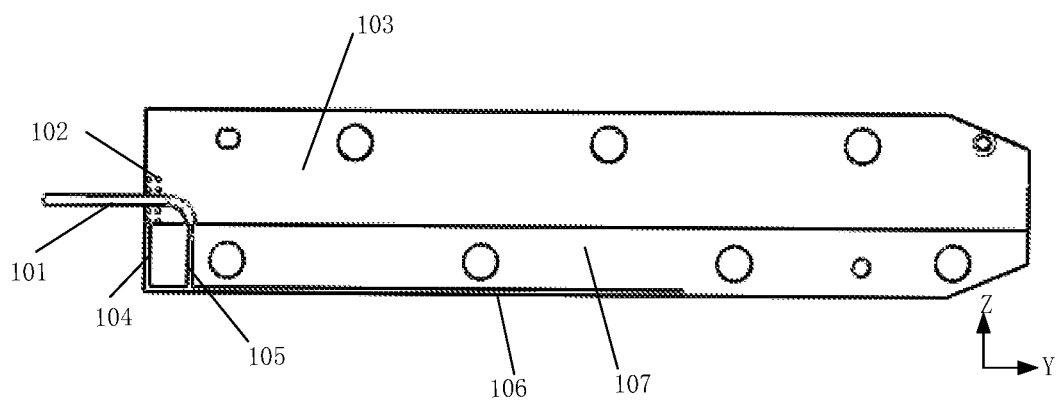
FIG. 1 is a first schematic structural diagram of an embodiment of an unmanned aerial vehicle built-in antenna according to the embodiments of the present invention.

1. Unmanned aerial vehicle arm
2. Unmanned aerial vehicle landing gear
3. Motor
101. Feeding coaxial line
102. Through hole
103. First grounding terminal
104. Grounding wire
105. Microstrip feeder
106. Antenna element arm
107. Substrate
108. Second grounding terminal

DETAILED DESCRIPTION

The following describes specific implementations of the present invention in detail with reference to the accompanying drawings.

In the description of the present invention, it should be understood that orientation or position relationships indicated by the terms such as "top", "bottom", "front", "back", "left", and "right" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention.

In addition, the terms "first" and "second" are merely for the purpose of description, and cannot be construed as indicating or implying relative importance or implicitly specifying the number of technical features indicated. Therefore, the features defined with "first" and "second" may include at least one of the features explicitly or implicitly.

In the present invention, unless otherwise explicitly specified and defined, terms such as "mounted", "connected", "fixed" should be understood in broad sense, for example, fixed connection, detachable connection, or integral connection; or the connection may be a direct connection, an indirect connection through an intermediary, or internal communication between two elements or mutual action relationship between two elements, unless otherwise specified explicitly. The specific meanings of the above terms in the present invention may be understood according to specific circumstances for a person of ordinary skill in the art.

In the present invention, unless otherwise clearly specified and limited, that a first feature is "above" or "below" a second feature may be that the first and the second features are in contact with each other directly, or the first and the second features are in contact with each other indirectly by using an intermediate medium. Moreover, the first feature is "over", "above", and "on" the second feature may mean that the first feature is directly above or obliquely above the second feature, or simply means that the first feature has a higher horizontal height than the second feature. The first feature is "under", "below" and "underneath" the second feature may mean that the first feature is directly below or obliquely below the second feature, or simply means that the first feature has a lower horizontal height than the second feature.

A built-in antenna provided in the embodiments of the present invention may be applied to an unmanned aerial vehicle. An unmanned aerial vehicle in the embodiments of the present invention may be applied to a military scenario and a civil scenario. The civil scenario includes aerial photography, express transportation, disaster relief, wildlife observation, surveying and mapping, news reporting, electric checking and the like.

In the built-in antenna provided in the embodiments of the present invention, a microstrip antenna is disposed on a substrate. The microstrip antenna includes a feeding coaxial line, a first grounding terminal, a grounding wire, a micro strip feeder, an antenna element arm and a second grounding terminal. The first grounding terminal, the grounding wire, the microstrip feeder and the antenna element arm are disposed on a first surface of the substrate, and the second grounding terminal is disposed on a second surface of the substrate, to resolve problems of spatial size and environmental interference.

The technical solutions of the present invention are described in detail below by using specific embodiments. The following specific embodiments may be mutually combined, and same or similar concepts or processes may not be repeatedly described in some embodiments.

Figure 2:
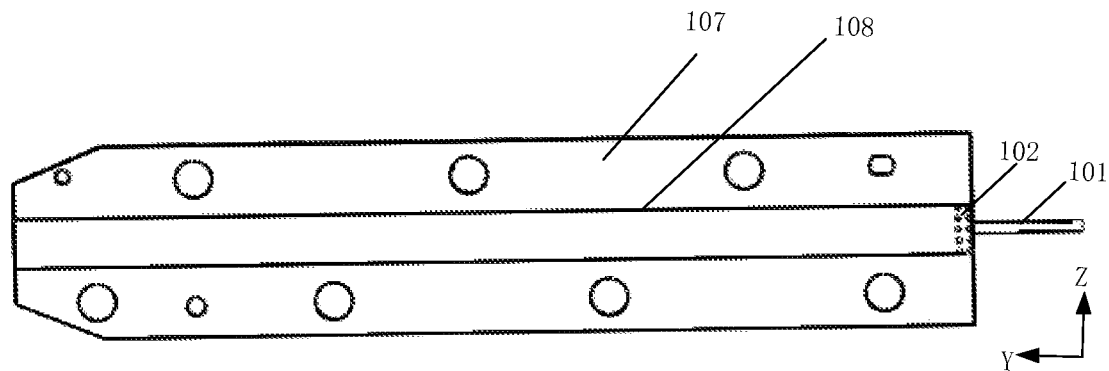
FIG. 2 is a second schematic structural diagram of an embodiment of an unmanned aerial vehicle built-in antenna according to the embodiments of the present invention.

FIG. 1 is a first schematic structural diagram of an embodiment of an unmanned aerial vehicle built-in antenna according to the embodiments of the present invention. FIG. 2 is a second schematic structural diagram of an embodiment of an unmanned aerial vehicle built-in antenna according to the embodiments of the present invention. As shown in FIG. 1 and FIG. 2, the unmanned aerial vehicle built-in antenna of this embodiment may include:

a substrate 107 and a microstrip antenna disposed on the substrate 107. The substrate 107 includes a first surface and a second surface disposed opposite to each other.

The microstrip antenna includes a feeding coaxial line 101, a first grounding terminal 103, a grounding wire 104, a microstrip feeder 105, an antenna element arm 106 and a second grounding terminal 108. The first grounding terminal 103, the grounding wire 104, the microstrip feeder 105 and the antenna element arm 106 are disposed on the first surface of the substrate 107. The second grounding terminal 108 is disposed on the second surface of the substrate 107.

Specifically, a feed terminal of the feeding coaxial line 101 is connected to a first terminal of the microstrip feeder 105, and a grounding terminal of the feeding coaxial line 101 is connected to the first grounding terminal 103.

A first end of the grounding wire 104 is connected to a first terminal of the antenna element arm 106, and a second end of the grounding wire 104 is connected to the first grounding terminal 103.

The first grounding terminal 103 is connected to the second grounding terminal 108.

A second terminal of the microstrip feeder 105 is connected to the antenna element arm 106.

The substrate 107 may be disposed in an arm of the unmanned aerial vehicle.

It may be understood that, in other embodiments, an end of the grounding wire 104 may further be vertically extended to the second terminal of the microstrip feeder 105, that is, the first end of the grounding wire 104 is connected to the second terminal of the microstrip feeder 105 and the first terminal of the antenna element arm 106, and the second end of the grounding wire 104 is connected to the first grounding terminal 103.

As shown in FIG. 1, the grounding wire 104 may include two parts that are perpendicular to each other. The first part is parallel to the microstrip feeder 105, the second part is perpendicular to the microstrip feeder 105, and the two parts are respectively connected to the second terminal of the microstrip feeder 105 and the first terminal of the antenna element arm 106.

Figure 3:
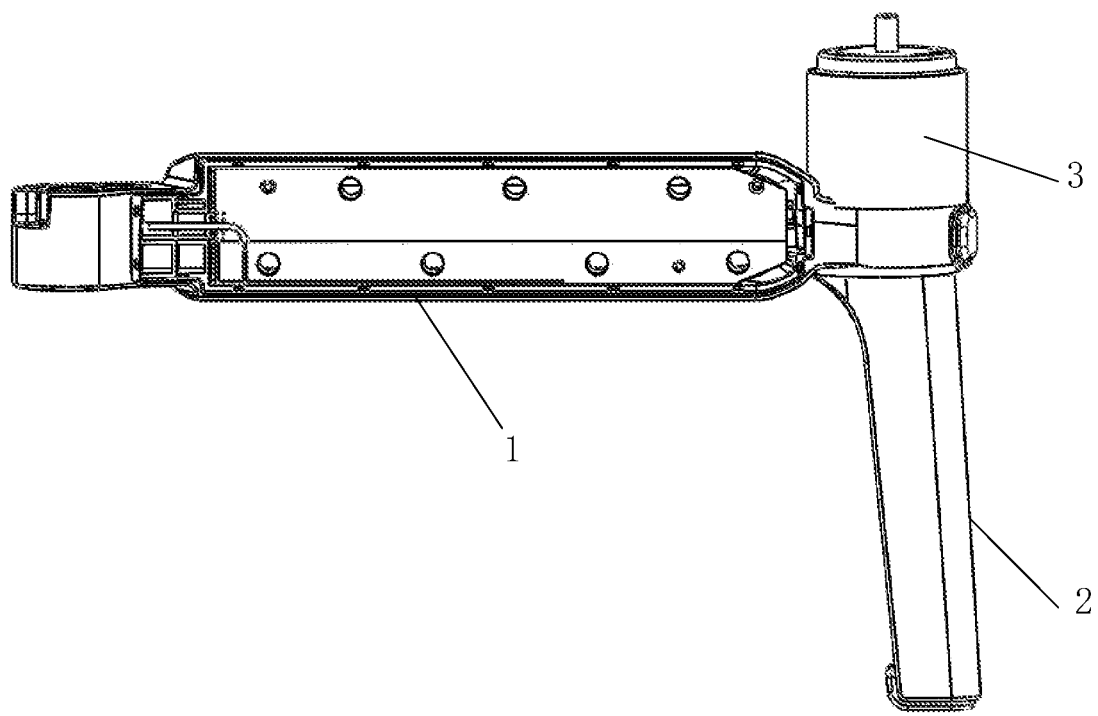
FIG. 3 is a schematic structural diagram of another embodiment of an unmanned aerial vehicle built-in antenna according to the embodiments of the present invention.

Specifically, as shown in FIG. 3, due to a limited size of an unmanned aerial vehicle landing gear 2, only a high frequency-band microstrip antenna, for example, an antenna of 2.4 GHz, can be accommodated. Therefore, an unmanned aerial vehicle built-in microstrip antenna (a microstrip antenna of a low frequency band, for example, 900 MHz) is placed in an unmanned aerial vehicle arm 1 with a complex environment. Finally the microstrip antenna can still work normally in a complex environment with motor wires for a motor and lamp panel wires for an indicator.

In FIG. 3, the unmanned aerial vehicle landing gear 2 and the unmanned aerial vehicle arm 1 are both connected to a motor 3.

The unmanned aerial vehicle built-in antenna may be a microstrip antenna of 900 MHz.

It should be noted that, in this embodiment of the present invention, the built-in antenna may further work in other frequency bands, which is not limited in the present invention.

The unmanned aerial vehicle built-in antenna mainly includes a radiation unit (the grounding wire 104, the microstrip feeder 105 and the antenna element arm 106), the first grounding terminal 103 and the second grounding terminal 108.

The motor wires, lamp panel wires and coaxial lines of other antennas passing through the unmanned aerial vehicle arm 1 are in close contact with the second grounding terminal 108, so that the motor wires, the lamp panel wires and the coaxial lines of other antennas in the unmanned aerial vehicle arm 1 have less impact on the built-in antenna, thereby enabling the built-in antenna to work normally in a complex electromagnetic environment.

The feed terminal of the feeding coaxial line 101 is connected to the first terminal of the microstrip feeder 105, the grounding terminal of the feeding coaxial line 101 is connected to a front grounding terminal of the substrate (that is, the first grounding terminal 103 of the substrate), and the feeding coaxial line 101 is connected to a radio frequency board of the unmanned aerial vehicle.

In some implementations, the antenna further includes at least one through hole 102 provided on the substrate 107.

The first grounding terminal 103 of the substrate 107 may be connected to the second grounding terminal 108 (that is, a back grounding terminal) of the substrate 107 through the at least one through hole 102.

The first end of the grounding wire 104 is connected to the first terminal of the antenna element arm 106, and the second end of the grounding wire 104 is connected to the first grounding terminal 103.

In some implementations, the substrate 107 is made of an FR-4 grade material.

Specifically, FR-4 is a designation for a grade of a flame-resistant material, which represents a specification of a material that needs to be self-extinguishing after a burning state of a resin material. It is not a material name but a material grade. At present, there are many different types of FR-4 grade materials used in general circuit boards, but most of them are composite materials made of the tera-function epoxy resin with fillers and glass fibers.

In an example of the present invention, an overall size of the antenna substrate is $87 \times 18 \times 0.6$ mm$^3$. That is, a length of the substrate is 87 mm, a width of the substrate is 18 mm, and a thickness of the substrate is 0.6 mm.

The unmanned aerial vehicle built-in antenna in this embodiment includes a substrate and a microstrip antenna disposed on the substrate. The substrate is provided with a first surface and a second surface disposed opposite to each other. The microstrip antenna includes a microstrip feeder, an antenna element arm, a grounding wire and a first grounding terminal that are disposed on the first surface of the substrate, a second grounding terminal disposed on the second surface of the substrate and a feeding coaxial line. A feed terminal of the feeding coaxial line is connected to a first terminal of the microstrip feeder, and a grounding terminal of the feeding coaxial line is connected to the first grounding terminal. A first end of the grounding wire is connected to a first terminal of the antenna element arm, and a second end of the grounding wire is connected to the first grounding terminal. The first grounding terminal is connected to the second grounding terminal. A second terminal of the microstrip feeder is connected to the antenna element arm. The microstrip antenna of the above unmanned aerial vehicle built-in antenna is disposed on the substrate, and can be built in the unmanned aerial vehicle and meet a built-in spatial size requirement. Moreover, due to existence of the second grounding terminal, internal cables inside the unmanned aerial vehicle such as motor wires, lamp panel wires and coaxial lines from other antennas have less impact on the built-in antenna, thereby enabling the built-in antenna to work normally in a complex electromagnetic environment.

Based on the above embodiments, optionally, as shown in FIG. 1, the grounding wire 104 and the microstrip feeder 105 are parallel to each other.

The antenna element arm 106 is perpendicular to the grounding wire 104 and the microstrip feeder 105.

Alternatively, the grounding wire 104 and the micro strip feeder 105 form a U shape, and the antenna element arm 106 is perpendicular to the microstrip feeder 105.

As shown in FIG. 1, the grounding wire 104 may include two parts that are perpendicular to each other. A first part is parallel to the microstrip feeder 105, a second part is perpendicular to the microstrip feeder 105, and the two parts are respectively connected to the second terminal of the microstrip feeder 105 and the first terminal of the antenna element arm 106.

In some implementations, as shown in FIG. 1, the antenna element arm 106 is disposed on an edge of the substrate 107 along a length direction of the substrate 107.

Specifically, as shown in FIG. 1, the built-in antenna adopts a form of an inverted F antenna, which occupies a relatively small space.

It should be noted that, in other implementations, other antenna structures such as a monopole, a dipole and an annular antenna may alternatively be adopted.

In some implementations, as shown in FIG. 1, the first grounding terminal 103 is disposed on the first surface of the substrate 107 along the length direction of the substrate 107.

In some implementations, as shown in FIG. 2, the second grounding terminal 108 is disposed in the middle of the second surface of the substrate 107 along the length direction of the substrate 107, and a projection area of the second grounding terminal 108 on the substrate 107 falls within a projection area of the first grounding terminal 103 on the substrate 107.

Specifically, the projection area of the second grounding terminal 108 on the substrate 107 may overlap a part of the projection area of the first grounding terminal 103 on the substrate 107.

It should be noted that the second grounding terminal 108 at which the second surface of the substrate is in contact with the motor wire, the lamp panel wire and the coaxial line may be located in the middle of the substrate, or the second grounding terminal 108 may be located on the second surface of the substrate where it overlaps projections of the motor wire, the lamp panel wire and the coaxial line according to a structure change.

In some implementations, as shown in FIG. 2, the second grounding terminal 108 is disposed on the substrate 107 along the length direction of the substrate 107, and a projection area of the second grounding terminal 108 on the substrate 107 is greater than or equal to a projection area of motor wires and lamp panel wires in an arm of the unmanned aerial vehicle on the substrate.

It should be noted that an area of the second grounding terminal 108 may be slightly larger than a projection area of back wires to be covered. That is, the area of the second grounding terminal 108 may be enlarged at a position where it does not overlap a projection of an antenna radiation unit (such as the grounding wire 104, the microstrip feeder 105 or the antenna element arm 106).

In the above specific implementations, the motor wires, the lamp panel wires and the coaxial lines passing through the unmanned aerial vehicle arm are in close contact with the second grounding terminal. The projection area of the second grounding terminal on the substrate is greater than or equal to the projection area of the motor wires and the lamp panel wires in the arm of the unmanned aerial vehicle on the substrate. Therefore, the back wires of the substrate are covered, so that the motor wires, the lamp panel wires and the coaxial lines inside the arm have less impact on the antenna, thereby enabling the antenna to work normally in a complex electromagnetic environment.

Figure 4:
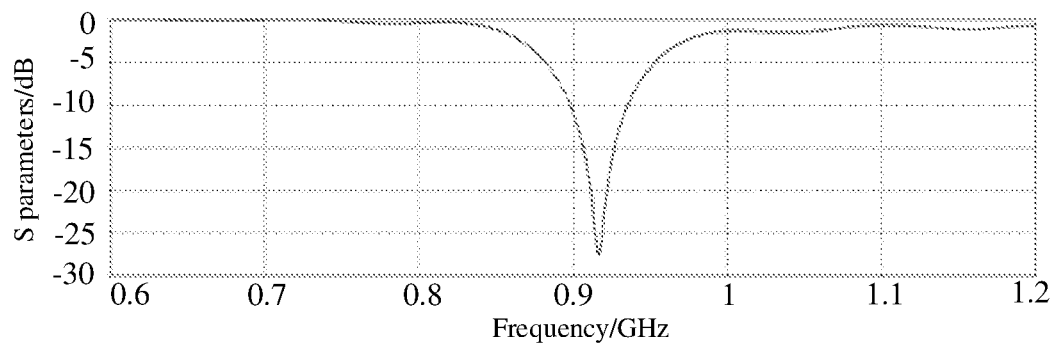
FIG. 4 is a schematic diagram of scattering parameters of a microstrip antenna of an embodiment of an unmanned aerial vehicle built-in antenna according to the embodiments of the present invention.

The following is an example of the antenna working in the 900 MHz frequency band:

FIG. 4 is a schematic diagram of scattering parameters of a microstrip antenna of an embodiment of an unmanned aerial vehicle built-in antenna according to the embodiments of the present invention. Dual-band microstrip antenna scattering parameters (S parameters) are shown in FIG. 4. It may be learned from FIG. 4 that a range of a bandwidth with the S parameter less than −10 dB is 897-935 MHz, that is, the built-in antenna may work in a frequency band range of 897-935 MHz, and the bandwidth is 38 MHz, which can meet coverage of a common frequency band of 900 MHz.

Figure 5:
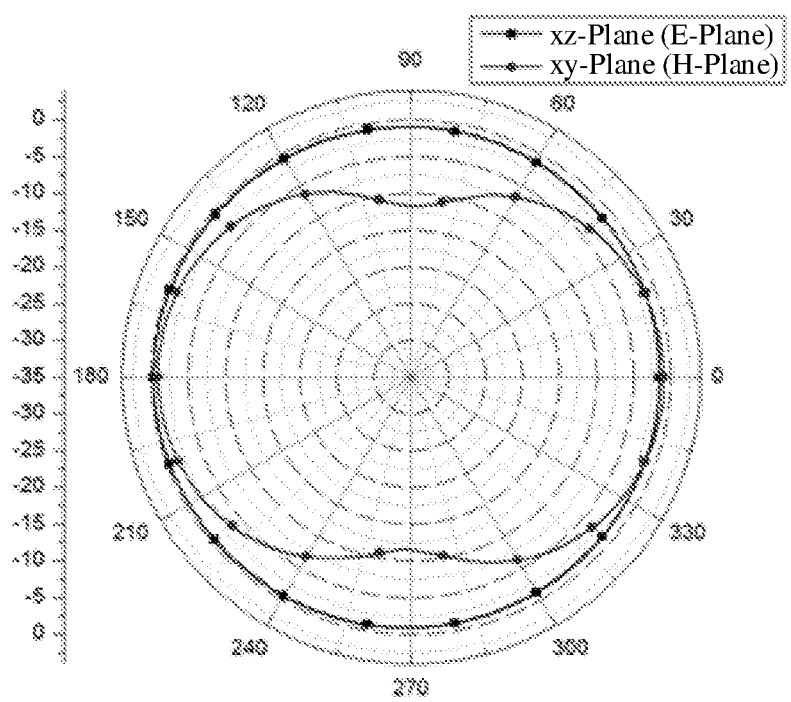
FIG. 5 is a radiation pattern of an embodiment of an unmanned aerial vehicle built-in antenna according to the embodiments of the present invention.

A radiation pattern of the antenna is FIG. 5. It may be learned from FIG. 5 that the antenna of 900 MHz basically can achieve omnidirectional coverage.

An embodiment of the present invention further provides an unmanned aerial vehicle, including an arm, and further including the unmanned aerial vehicle built-in antenna according to any of the above embodiments. The unmanned aerial vehicle built-in antenna is disposed in the unmanned aerial vehicle arm.

The unmanned aerial vehicle built-in antenna includes:

a substrate and a microstrip antenna disposed on the substrate. The substrate is provided with a first surface and a second surface disposed opposite to each other.

The microstrip antenna includes a microstrip feeder, an antenna element arm, a grounding wire and a first grounding terminal that are disposed on the first surface of the substrate, a second grounding terminal disposed on the second surface of the substrate and a feeding coaxial line.

A feed terminal of the feeding coaxial line is connected to a first terminal of the microstrip feeder, and a grounding terminal of the feeding coaxial line is connected to the first grounding terminal.

A first end of the grounding wire is connected to a first terminal of the antenna element arm, and a second end of the grounding wire is connected to the first grounding terminal.

The first grounding terminal is connected to the second grounding terminal.

A second terminal of the microstrip feeder is connected to the antenna element arm.

An implementation principle of the unmanned aerial vehicle built-in antenna in this embodiment is similar to that in the foregoing embodiment. Details are not described herein again.

The unmanned aerial vehicle built-in antenna in this embodiment includes a substrate and a microstrip antenna disposed on the substrate. The substrate is provided with a first surface and a second surface disposed opposite to each other. The microstrip antenna includes a microstrip feeder, an antenna element arm, a grounding wire and a first grounding terminal that are disposed on the first surface of the substrate, a second grounding terminal disposed on the second surface of the substrate and a feeding coaxial line. A feed terminal of the feeding coaxial line is connected to a first terminal of the microstrip feeder, and a grounding terminal of the feeding coaxial line is connected to the first grounding terminal. A first end of the grounding wire is connected to a first terminal of the antenna element arm, and a second end of the grounding wire is connected to the first grounding terminal. The first grounding terminal is connected to the second grounding terminal. A second terminal of the microstrip feeder is connected to the antenna element arm. The microstrip antenna of the above unmanned aerial vehicle built-in antenna is disposed on the substrate, and can be built in the unmanned aerial vehicle and meet a built-in spatial size requirement. Moreover, due to existence of the second grounding terminal, internal cables inside the unmanned aerial vehicle such as motor wires, lamp panel wires and coaxial lines from other antennas have less impact on the built-in antenna, thereby enabling the built-in antenna to work normally in a complex electromagnetic environment.

The preferred implementations of the present invention are described in detail above with reference to the accompanying drawings, but the present invention is not limited to the specific details in the above implementations. Various simple variations may be made to the technical solutions of the present invention within the scope of the technical idea of the present invention, and such simple variations shall all fall within the protection scope of the present invention.

It should be further noted that the specific technical features described in the above specific implementations may be combined in any suitable manner without contradiction. To avoid unnecessary repetition, various possible combinations are not further described in the present invention.

In addition, the various implementations of the present invention may be combined without departing from the idea of the present invention, and such combinations shall also fall within the scope of the present invention.

What is claimed is:

1. An unmanned aerial vehicle built-in antenna, comprising:
    a substrate and a microstrip antenna disposed on the substrate, the substrate being provided with a first surface and a second surface disposed opposite to each other; and
    the microstrip antenna comprising a microstrip feeder, an antenna element arm, a grounding wire and a first grounding terminal that are disposed on the first surface of the substrate, a second grounding terminal disposed on the second surface of the substrate and a feeding coaxial line, wherein
    a feed terminal of the feeding coaxial line is connected to a first terminal of the microstrip feeder, and a grounding terminal of the feeding coaxial line is connected to the first grounding terminal;
    a first end of the grounding wire is connected to a first terminal of the antenna element arm, and a second end of the grounding wire is connected to the first grounding terminal;
    the first grounding terminal is connected to the second grounding terminal; and
    a second terminal of the microstrip feeder is connected to the antenna element arm.

2. The antenna according to claim 1, wherein
    the grounding wire and the microstrip feeder are parallel to each other;
    the antenna element arm is perpendicular to the grounding wire and the microstrip feeder; or
    the grounding wire and the microstrip feeder form a U shape and the antenna element arm is perpendicular to the microstrip feeder.

3. The antenna according to claim 2, wherein
    the antenna element arm is disposed on an edge of the substrate along a length direction of the substrate.

4. The antenna according to claim 1, wherein
    the first grounding terminal is disposed on the first surface of the substrate along the length direction of the substrate.

5. The antenna according to claim 4, wherein
    the second grounding terminal is disposed in the middle of the second surface of the substrate along the length direction of the substrate, and a projection area of the second grounding terminal on the substrate falls within a projection area of the first grounding terminal on the substrate.

6. The antenna according to claim 1, wherein
    the second grounding terminal is disposed on the substrate along the length direction of the substrate, and a projection area of the second grounding terminal on the substrate is greater than or equal to a projection area of motor wires and lamp panel wires in an arm of the unmanned aerial vehicle on the substrate.

7. The antenna according to claim 1, further comprising at least one through hole provided on the substrate,
    the first grounding terminal being connected to the second grounding terminal through the at least one through hole.

8. The antenna according to claim 1, wherein
    the substrate is made of an FR-4 grade material.

9. The antenna according to claim 1, wherein
    the microstrip antenna is a microstrip antenna of 900 MHz.

10. The antenna according to claim 1, wherein the substrate is disposed in an arm of an unmanned aerial vehicle.

11. The antenna according to claim 1, wherein an end of the grounding wire may further be vertically extended to the second terminal of the microstrip feeder.

12. The antenna according to claim 1, wherein the grounding wire comprises two parts that are perpendicular to each other; a first part is parallel to the microstrip feeder, a second part is perpendicular to the microstrip feeder, and the two parts are respectively connected to the second terminal of the microstrip feeder and the first terminal of the antenna element arm.

13. The antenna according to claim 1, wherein the feed terminal of the feeding coaxial line is connected to the first terminal of the microstrip feeder, the grounding terminal of the feeding coaxial line is connected to a front grounding terminal of the substrate, and the feeding coaxial line is connected to a radio frequency board of an unmanned aerial vehicle.

14. The antenna according to claim 1, wherein an overall size of the antenna substrate is 87×18×0.6 mm$^3$. That is, a length of the substrate is 87 mm, a width of the substrate is 18 mm, and a thickness of the substrate is 0.6 mm.

15. The antenna according to claim 1, wherein the built-in antenna adopts a form of an inverted F antenna.

16. The antenna according to claim 1, wherein an antenna structure is a monopole, a dipole or an annular antenna.

17. The antenna according to claim 1, wherein a projection area of the second grounding terminal on the substrate may overlap a part of a projection area of the first grounding terminal on the substrate.

18. An unmanned aerial vehicle, comprising an arm, and further comprising the unmanned aerial vehicle built-in antenna according to claim 1, wherein the unmanned aerial vehicle built-in antenna is disposed in the arm.

* * * * *